(12) United States Patent
Cassar et al.

(10) Patent No.: US 6,409,821 B1
(45) Date of Patent: *Jun. 25, 2002

(54) HYDRAULIC BINDER AND CEMENT COMPOSITIONS CONTAINING PHOTOCATALYST PARTICLES

(75) Inventors: Luigi Cassar, Milan; Carmine Pepe, Bergamo, both of (IT)

(73) Assignee: Italcementi S.p.A., Bergamo (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/230,939

(22) PCT Filed: Jul. 24, 1997

(86) PCT No.: PCT/EP97/04008

§ 371 (c)(1),
(2), (4) Date: Sep. 2, 1999

(87) PCT Pub. No.: WO98/05601

PCT Pub. Date: Feb. 12, 1998

(30) Foreign Application Priority Data

Aug. 7, 1996  (IT) .......................................... MI96A1722

(51) Int. Cl.⁷ .......................... C04B 22/06; C04B 24/30
(52) U.S. Cl. ....................................... 106/733; 106/819
(58) Field of Search .................................. 106/733, 738, 106/819

(56) References Cited

U.S. PATENT DOCUMENTS

| 5,518,992 A | * | 5/1996 | Linkous ....................... 504/151 |
| 6,037,289 A | * | 3/2000 | Chopin et al. ................. 502/2 |
| 6,117,229 A | * | 9/2000 | Cassar et al. ................ 106/724 |

FOREIGN PATENT DOCUMENTS

| EP | 590477 | * | 4/1994 |
| EP | 633064 | * | 1/1995 |
| GB | 849175 | * | 9/1960 |

OTHER PUBLICATIONS

Patent Abstracts Of Japan, Abstract of Japanese Patent Specification No. 03–279242 (Dec. 1991).*
Patent Abstracts of Japan, Abstract of Japanese Specification No. 06–191913 (Dec. 1992).

* cited by examiner

*Primary Examiner*—Anthony Green
(74) *Attorney, Agent, or Firm*—Hedman & Costigan, P.C.

(57) ABSTRACT

The invention provides a hydraulic binder, dry premixes and cement compositions having the improved property of maintaining unaltered, brilliance and coloring quantity for a longer time period. These compositions contain, in bulk, particles of a photocatalyst capable of oxidizing polluting substances in the environment in the presence of light, oxygen and water.

11 Claims, 6 Drawing Sheets

(4 of 6 Drawing Sheet(s) Filed in Color)

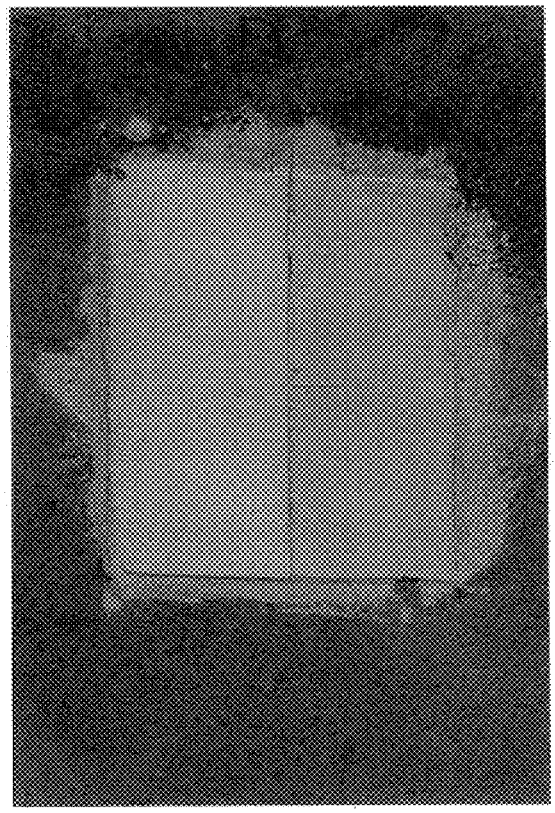 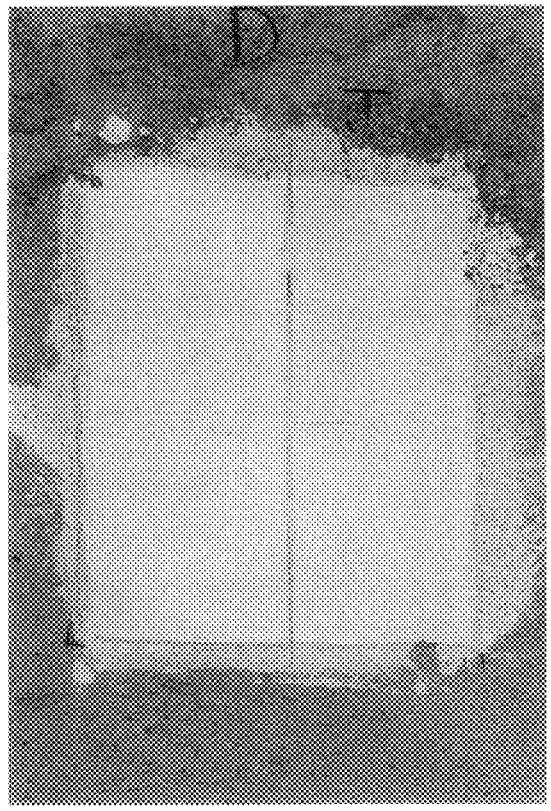
FIG. 1A
FIG. 1B

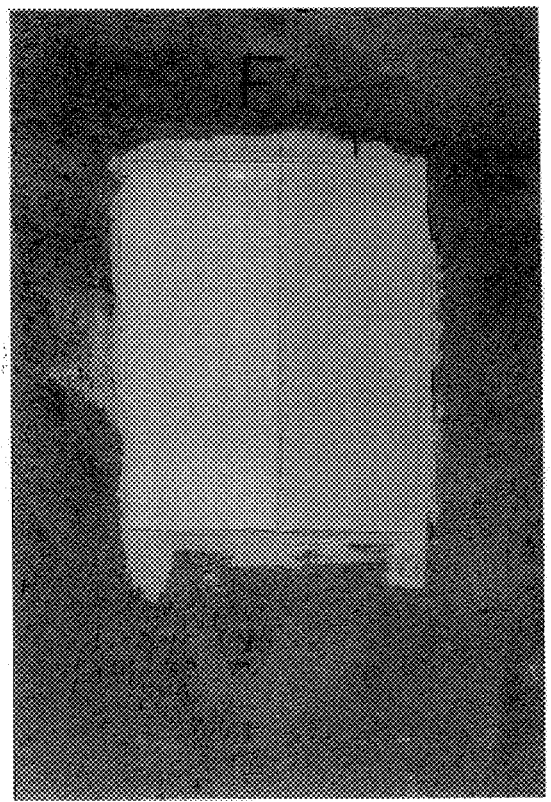 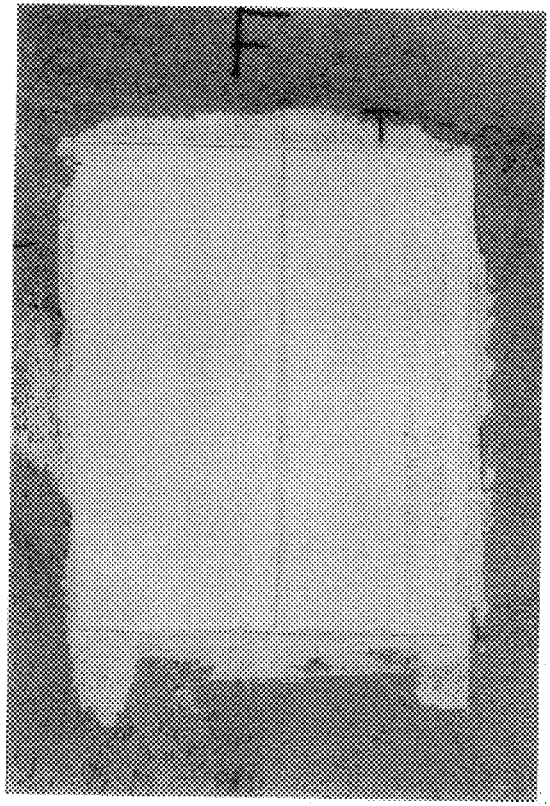
FIG. 3A
FIG. 3B

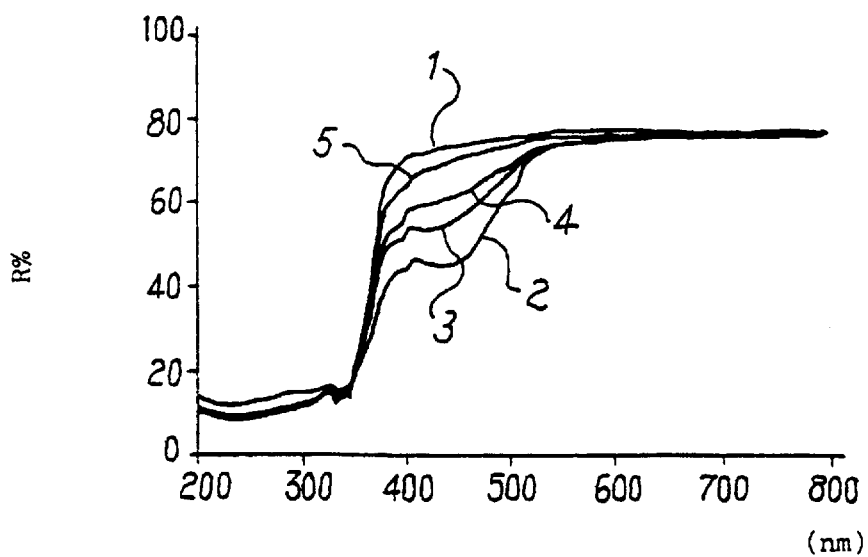
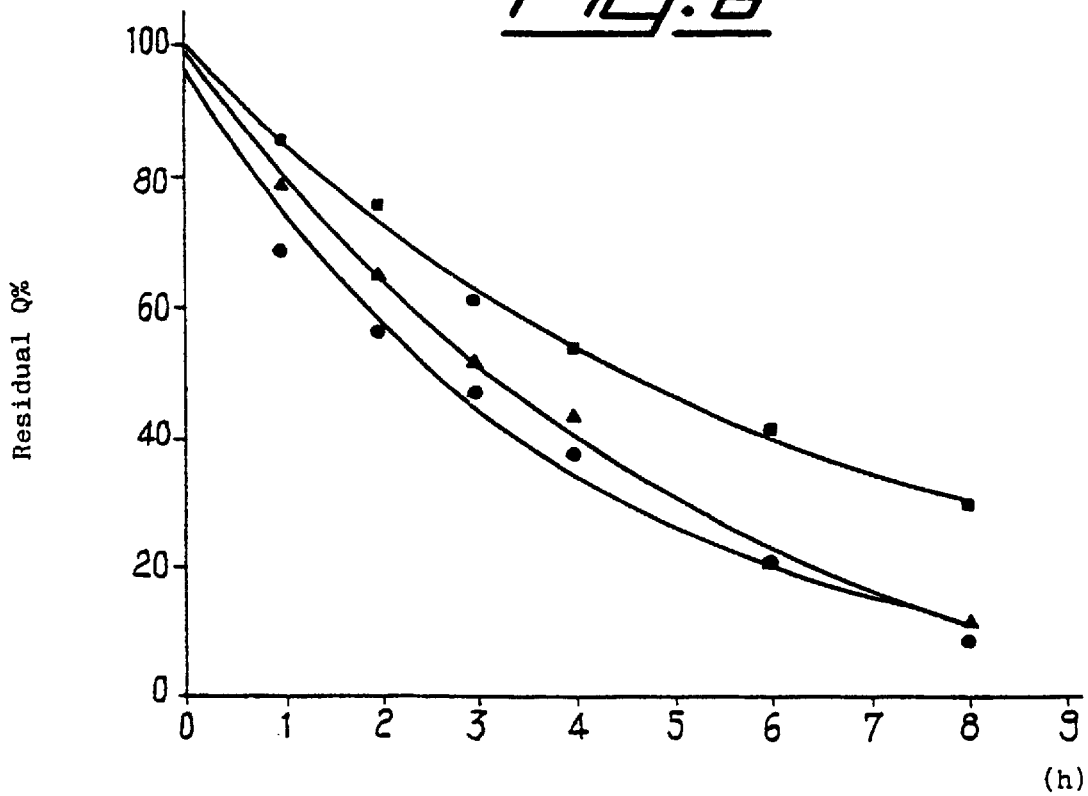

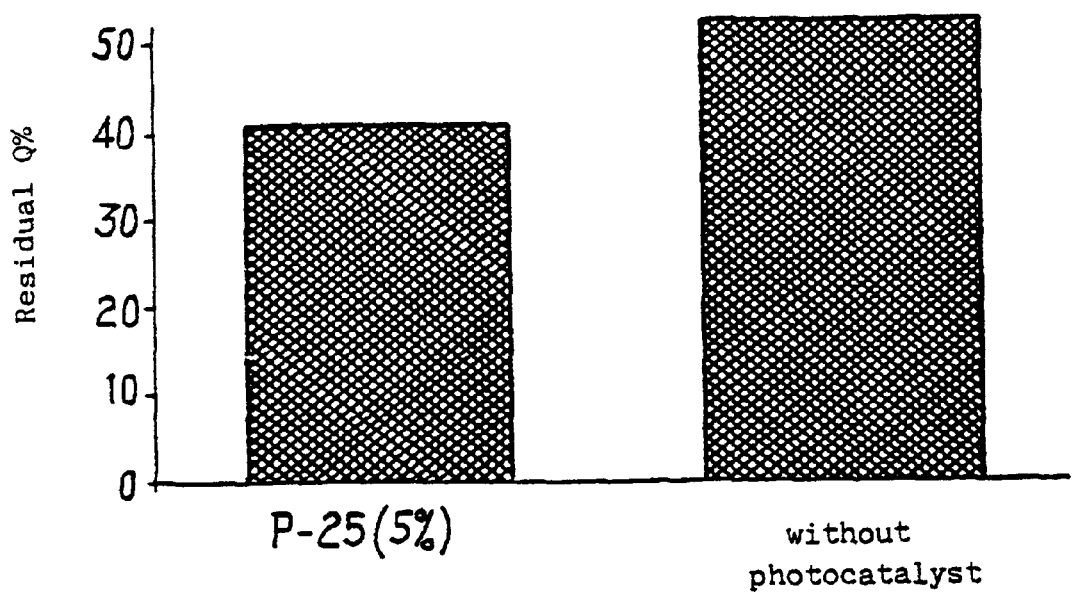

HYDRAULIC BINDER AND CEMENT COMPOSITIONS CONTAINING PHOTOCATALYST PARTICLES

The present application is the national stage filing of and claims priority to International Application No. PCT/EP97/04008, filed Jul. 24, 1997 and Italian Application Serial No. MI96A001722, filed Aug. 7, 1996.

FIELD OF THE INVENTION

The present invention relates to a hydraulic binder, a dry premix, a cement composition having improved property to maintain, after the installation, for longer time periods the brilliance and the colour quantity.

PRIOR ART

One of the most important use for cement (either grey or white) is in the manufacture of the so called "architectural concretes", i.e. castings in work with not treated (flat or profiled) or treated (for example sand-blasted) surfaces. Particularly the white cement is used as a decorative element in the light prefabrication and in the production of paving tiles. The architectural concrete composition, particularly the white one, must meet the requirement to obtain besides good mechanical resistances and durability with time also surfaces having good appearance and therefore uniform in colour and texture.

In order to obtain architectural concretes having homogeneous colour and constant composition it is essential the selection of the inert material but, while said inert material forms up to 80% of the concrete mass, the concrete surface has a composition differing from the underlying layers and therefore from its whole mass: the coarse inert material does not appear on the surface and the surface itself consists only of cement paste and sand.

As a consequence a surface of concrete manufactured with white cement and light sand turns out to be good, even if the coarse aggregate is darker.

The colour uniformity of the sand is less important than in the case of grey cement architectural concrete: the colour constancy of the white cement may cover, obviously within certain limits, the colour variations of the sand.

TECHNICAL PROBLEM

The principal problem of architectural concrete manufactures, both in grey cement and in white cement, concerns the constant maintenance with time of the original appearance; it is important to defer as late as possible the natural ageing process due, essentially, to the influence of atmospheric agents.

The protection of these manufactures is principally carried out with water-repellent products which are applied on the surfaces by spray or brush, as for example silicone solutions, which are stable in an alkaline environment, and possibly to light and bad weather. However, perhaps owing to the progressive increase of pollutants present in a typical metropolitan environment, the superficial protection of these products resists in towns for a more and more limited time with subsequent aesthetic degradation of the manufacture. In most cases the quick aesthetic degradation of these materials prevents from using these architectural concretes.

Therefore the need is felt to solve the problem of the preservation of the original appearance of the surface of the architectural concretes for longer time periods.

SUMMARY OF THE INVENTION

The Applicant has surprisingly found that this problem may be effectively solved using hydraulic binders comprising in bulk particles of suitable photocatalysts able A oxidize in the presence of light, oxygen and water the polluting substances present in the environment.

Any kind of photocatalyst able to oxidize -n the presence of light, air and environmental humidity (oxygen and water) the polluting substances contacting the surface of the hydraulic binder (or the relative mortars and concretes) in a hardened state is part of the present invention, particularly a titanium dioxide, mainly in the form of anatase, or a precursor thereof, optionally doped with other atoms different from Ti.

The present invention further relates to a method to preserve unaltered the brilliance and the colour quantity of an installed hydraulic binder for cement compositions characterized in that particles of said photocatalyst are added to said binder before the same is installed.

BRIEF DESCRIPTION OF THE DRAWINGS

The patent or application file contains at least one drawing executed in color. Copies of this patent or patent application publication with color drawings will be provided by the Office upon request and payment of the necessary fee.

FIGS. 1–4 report the images of the surfaces relating to the compositions of cement mortars D. E, F. G reported in Example 2. In particular FIGS. 1A–1B report the surface images relating to composition D, FIGS. 2A–2B to composition E, FIGS. 3A–3B to composition F, FIGS. 4A–4B to composition G.

FIG. 5 represent the % reflectance (R%) for the sample B encompassed in Example 5 measured at different times as a function of the wavelength (in nm).

FIG. 6 represent residual Q% as a function of time of samples (A) •, (B) ▼, (C) ■, described in Example 5 subjected to a wavelength higher than 290 nm (450 nm).

FIG. 7 represents hystograms of residual Q% of the white cement treated with 5% P-25® and white cement not treated (as such).

DETAILED DESCRIPTION OF THE INVENTION

Figure 2A:
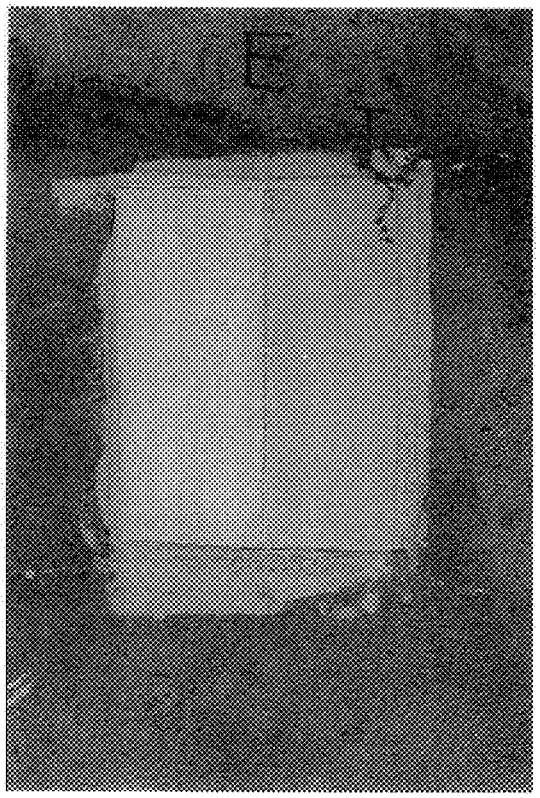

In the present description for "binder" or "hydraulic binder" we mean a hydraulic cement material, in powder form at the solid state, dry, which, once mixed with water, provides plastic mixtures able to set and harden. In the wide definition of "hydraulic binder", according to the present invention, are included both (white, grey or pigmented) cements as defined according to UNI ENV 197.1 standard and the so called cements for debris dams, cement agglomerates and hydraulic limes, as defined in the 1965,May 26 No. 595 Law. The present invention does not only regard the hydraulic binder wherein the photocatalyst is added to one of its components such as clinker or gypsum, in any phase of the relative preparation, but also a dry premix, namely a material comprising any hydraulic binder to which, before the installation thereof, photocatalyst particles are added. A further object of the present invention is a cement composition comprising the photocatalyst.

By "dry premix" we mean a homogeneous mixture of binder and aggregate and optionally at least one additive suitable to be mixed with water and for the preparation of mortars and concretes.

By "cement composition" or "cement mix" we mean any composition in which a binder is mixed with water, and optionally with aggregates having different granulometry. The cement compositions then include both the cement "pastes", i.e. mixtures of binder and water which are free from aggregates, and the mixes, i.e. mixtures of water, cement and aggregates. The "aggregates" or "inert materials" may be coarse aggregates, such as crushed stones or pebble gravel, or fine aggregates, such as sand, and they are classified in the UNI 8520 standard.

Examples of mixes are the mortars (mixtures of binder, water and fine aggregate), and the concretes (mixtures of water, binder, fine aggregate and coarse aggregate).

The "clinker" used for the preparation of the binder according to the present invention is any clinker of Portland cement as defined according to the UNI ENV 197.1 standard, i.e. a hydraulic material consisting of at least two thirds in mass of calcium silicates (3CaO $SiO_2$) and (2CaO $SiO_2$), the remaining part being $Al_2O_3$, $Fe_2O_3$ and other oxides.

The hydraulic binder, the dry premix or the cement compositions according to the present invention may then contain white, grey or pigmented cement, preferably white cement.

The particular property distinguishing essentially the white cement from the other cements is just that it is perfectly white. Grey colouring of common Portland cements derives from the presence of iron and other metal compounds.

White cement is obtained from raw materials which at the pure state are perfectly white and "white" pigmentation is the demonstration of the purity of its composition.

The dry premixes according to the present invention suitable to prepare mortars and concretes, particularly the "architectural" ones, but also cement plastering, finishing plastering, hydraulic limes or, more in general, cement finishes suitable to protect the concrete surfaces, preferably contain the hydraulic binder according to the present invention.

The dry premixes according to the present invention preferably contain white cement and they are characterized in that they maintain after their installation for longer time periods the brilliance and the colour quantity.

The present invention further relates to the use of a photocatalyst added "in bulk" to a hydraulic binder or to an agglomerate in order to preserve with time the aesthetic appearance, the brilliance and the colouring quantity.

In the present description the word in bulk means that the photocatalyst is added to the mass of the binder, and then it is distributed in the whole mass, that is even in the inner and deeper layers, and not only on the surface of the present binder, and consequently also of the mix or the premix obtained therefrom.

As far as dry premix is concerned, the definition "in bulk" means that photocatalyst particles are homogeneously mixed with the various components of said premix. In other words the dry premix may comprise both the binder already containing the photocatalyst and separately a conventional hydraulic binder and particles of photocatalyst.

Any type of photocatalyst able to oxidize in presence of light, oxygen and water the polluting substances which come into contact with the surface of the hydraulic binder at the hardened state may be used provided that they do not affect the physico-mechanical properties of the binder itself, thereby producing the opposite effect. For example photocatalysts such as cadmium sulfide (CdS) and zinc sulfide (ZnS) are not suitable while turngstic oxide ($WO_3$), calcium titanate or strontium titanate ($SrTiO_3$), in so far as the application on grey cements is concerned, may be used.

The preferred photocatalyst according to the present invention is titanium dioxide or one of its precursors, and more preferably "the titanium dioxide mainly in the form of anatase".

The expression "titanium dioxide mainly in the form of anatase" means that the photocatalyst particles present in the hydraulic binder of the present invention are particles of titanium dioxide ($TiO_2$) having anatase structure for at least 5%, preferably for 25%, more preferably at least 50%, even more preferably for at least 70% by weight. In a preferred aspect of the invention the $TiO_2$ P-25®, commercialized by Degussa, which is a mixture 70:30 of anatase $TiO_2$: rutile $TiO_2$ has been used.

In fact it is known that $TiO_2$ crystallizes into the tetragonal forms of anatase and rutile. The rutile is the most stable and industrially most important form.

The anatase may turn into rutile also at room temperature but with an extremely low velocity.

At higher temperatures the transformation velocity is more significant. The transformation from rutile to anatase is instead impossible for $TiO_2$ crystals; industrially this transformation is made possible thanks to the orienting action of certain impurities although the same are present in minimal quantities. The expression "titanium dioxide precursor" means that the preferred photocatalyst is not only limited to "$TiO_2$ prevailingly in the form of anatase" but it is extended also to any product which added to the baked clinker, to the hydraulic binder, to the premix or to the mix, may form the $TiO_2$ mainly under the anatase form optionally by suitable thermal treatments.

For example the so called "titanium paste" may be considered a valid precursor for the titanium dioxide based photocatalyst of the present invention.

The titanium paste ($TiO_2 \cdot H_2O$) derives from the treatment of the product $TiOSO_4$ with water and it may be effectively used as an anatase precursor without a particular thermal treatment. A particularly effective titanium paste is commercialized by TIOXIDE®.

The photocatalytic activity may also be obtained on $TiO_2$ matrices doped with suitable atoms such as Fe(III), Mo(V), Ru(III). Os(III), Re(V), V(IV) and Rh(III).

Particularly these atoms may substitute, at the atomic level, the Ti(IV) present in the $TiO_2$ matrix for at least 0.5%.

The method for obtaining such photocatalysts is described in literature for example in J. Phys. Chem. 1994, 98, 1127–34, Angew. Chemie 1994, 1148–9 and in Angew. Chemie Int., Ed. 1994, 33, 1091. The quantity of photocatalyst present in the hydraulic binder or in the mix of the invention is not a particularly critical aspect of the invention. For example, a content of about 0.1% by weight, preferably about 0.5% by weight of $TiO_2$, of one of its precursors or of another photocatalyst in bulk in the hydraulic binder, in the cement composition (e.g. mix or in the dry premix), is generally sufficient to provide the desired effect. It is correct and appropriate to point out that the photocatalytic action must not necessarily be quick since the manufacture dirtiness with the environmental pollutants occurs slowly with time.

We can conclude affirming that generally photocatalytic amounts ranging from 0,01 to 10% in bulk calculated with respect to the binder are sufficient amounts to produce the desired effect.

Therefore even extremely low percentages of photocatalysts may produce a very high effect of colour conservation with time.

By "environmental polluting substances" we mean the organic substances which may be present in the environment due to cars exhausts or industrial waste such as benzene, volatile aromatic compounds, pesticides, organic aromatic compounds, benzofluorides, etc.

According to a particularly preferred aspect of the present invention phenanthroquinone has been used as the organic polluting substance. The selection of this specific compound is considered particularly significant to demonstrate the great advantage obtainable with the products object of the present invention.

In particular this selection was made on the basis of the preliminary knowledge of the more or less significant percentage components of a typical environment of big towns.

An important class of compounds present as pollutants in the troposphere is that of polycyclic aromatic hydrocarbons (PAH). These compounds and their analogues containing the heteroatoms (such as S, N, O), derive from the incomplete combustion of organic material such as carbon, oil, wood, fuels, etc. The PAH mechanism formation is based on the production of free radicals by hydrolysis (~500+800° C.) of hydrocarbons in the reducing zone of the flame, characterized by having an insufficient oxygen flow, the structure of these compounds is characterized by containing at least two condensed aromatic rings in the same molecule.

As it was demonstrated in several experiments in vitro and in vivo, many compounds belonging to said class show mutagen and carcinogen activity. In particular, phenanthroquinone belonging to PAH class was selected for the following reasons:

it is a substance not raising handling problems;
it is a substance giving a yellow colouring and its disappearance may be followed visually;
it is soluble in methanol, a solvent easily evaporating, once it is applied onto the surface to be treated.

Neither inorganic pollutants are to be excluded such as the nitrogen oxides $NO_X$ which with the photocatalyst according to the present invention can be oxidized to nitrates.

The photocatalytic action of titanium dioxide is well known in the art, as it is known that $TiO_2$ particles may adhere to inorganic substrates such as cement.

On the contrary what is not described is the use of titanium or, more generally, of a photocatalyst, in bulk, in the cement or in the mix in order to maintain constant the quality of the superficial appearance in terms of brilliance and colour quantity of the hardened manufacture. By "colour quantity" we mean the ensemble of the characteristics of dominating wavelength and purity, as defined below. Thanks to the peculiar aspect to maintain with time unaltered the colouring, a preferred aspect of the invention relates particularly to the use of white cement and prepared cement as hydraulic binder.

The "white colouring" of the cement may be characterized by three properties:

as brilliance, that is power to reflect the incident light (which is the typical characteristic of white bodies in contrast to black bodies), expressed as per cent ratio between the light reflected by a surface of white cement and the one reflected by an equal surface of magnesium oxide, conventionally considered the ideal white body; in white cements produced in Italy the brilliance value is higher than 82, and in mortars produced with these cements it is a little lower; as dominating wavelength, that is tonality of the gradation which accompanies and characterizes every white (in fact white bodies are not equal among each other); the dominating wavelength lies between yellow and blue;

as purity, or intensity of the gradation; purity is measured by the percentage of colour, which is lower than 5%.

The use of photocatalysts according to the present invention therefore allows to keep constant as long as possible these three important properties.

White cement may also be pigmented in order to obtain an additional chromatic effect.

This effect turns out to be decidedly better than the one obtainable, at equal conditions, with grey cement. It is interesting to notice that white cement, owing to its chemical composition, does not affect either the tone or the luminosity of the colouring obtained with the pigment (alterations which on the contrary are unavoidable with the use of the grey cement).

The pigment is to be mixed intimately in the mixture or, separately, with the cement. The percentage of addition is to be searched case by case according to the chromatic effect which one wish to obtain. This percentage is referred to the weight of the cement (e.g., if mineral pigments based on iron oxide are used, the above mentioned percentage is about 2% with respect to the weight of the cement).

Pigments are generally: inorganic base dyes as for example natural dyes (yellow ocher, reds based on iron oxide such as red ocher, English red, Spanish red; amber earth colour; ultramarine blue; etc.) or mineral dyes (yellow zinc chromate; Schweinfurt green; Berlin blue; Bremen blue); lead based dyes such as Naples yellow; chrome yellow; the group of mineral dyes based on iron oxide (having a chromatic range from brown to orange and to yellow).

As it has been previously described with the binder of the invention mixes (mortars and concretes) can be produced particularly the "architectural" ones, preferably manufactured with premixes comprising white cement and characterized by maintaining for longer time periods the brilliance and the colouring quantity.

Cement compositions such as mortars and concretes manufactured with the binder of the invention are particularly mortars having binders/aggregates ratios by weight ranging from 2/1 to 1/1 and concretes having binders/aggregates ratios by weight ranging from 1/3 to 1/6.

The water quantity used in the cement compositions is that sufficient to complete the hydration reaction of the binder and to provide the optimal workability at the plastic state of the mixture. The proportion among water, binder and possible aggregates of the cement compositions may vary within wide limits, and it is a function of the properties and the final uses of the desired mortars and concretes. In general terms the water quantity ranges from about 20 to 60% by weight with respect to the weight of the binder.

The method for preparing mix may be any conventional one. The temperature of mix formation between the binder and water, and optional aggregates, generally ranges from +5° to 30° C., and it is preferably at least 20° C.

The photocatalyst addition to the hydraulic binder is not a critical phase; the photocatalyst may be simply added to the powder of the hydraulic binder and mixed according to any technique known in the art, by using both an automatic mixer and manually.

Being the simple addition of the photocatalyst to the binder in powder form possible, the premixes according to the present invention are preferred. We report hereinbelow the following Examples of the invention for illustrative but not limitative purposes. It is necessary to point out that an exhaustive exemplification of the invention can be carried out only by very long (of the order of years) procedures because the correct evaluation of the maintenance of the characteristics of the hardened binders, particularly of architectural concretes, need natural "ageing" procedures in the real microclimate.

EXAMPLE 1

Some supports having 25×8×2.5 cm size have been realized with normal cement mortar based on Italbianco Italcementi 52.5® white cement.

After manufacturing the test samples have been cured for 1 day in the molds in the environment at 20° C. and RH>90%; after ejection they have been stored for further 7 days at 20° C. and RH≈60% (RH=Relative Humidity).

These test samples have then been used as supports for the applications of a cement mortar added with titanium dioxide. The base mortar had the following formulation:

| | |
|---|---|
| Italbianco Italcementi white cement | 35.4% |
| Metakaolin | 3.5% |
| Quartz (0.06–0.25 mm) | 59.7% |
| Cellulose Ether | 0.2% |
| MELMENT F10 (melanine condensed with formaldehyde) | 0.25% |
| Cellulose Fibres | 0.25% |
| ELOTEX 50 AV/90 Terpolymer (butylacrylate/vinylacetate/vinyl versatate) terpolymer | 0.7% |
| Ratio Water/Cement | 0.60 |

In particular, six compositions have been realized using the following dosages of titanium dioxide, referred to the weight of the cement:

0—as such (titanium dioxide 0%)
1—10%
2—5%
3—1%
4—0.5%
5—0.1%

Titanium dioxide, commercialized under the P-25 trademark of Degussa, has been used.

Every composition has been vigorously stirred for 5 minutes by means of a high speed mixer, until obtaining of a fluid consistency (spatulable).

Subsequently, the compositions have been applied with a metallic spatula on the above described supports; at the end of the application the average thickness of the mortar turned out to be of about 2 mm. The test samples, so realized, have been then cured for 7 days at 20° C. and RH≈60%. Then 0.5% alcoholic solution of various condensates based on polycondensated aromatic compounds has been applied with a brush onto half surface of each test sample (about 100 cm$^2$). 6 g, (corresponding to 0.03 g of dry product) of this solution, having a yellow colouration, have been applied on every 100 cm$^2$ as a consequence that 0.3 mg/cm$^2$ have been applied on each sample.

Every test sample showed at the end of the treatment two zones with well distinct colourings:

yellow, the treated part
white, the untreated part.

Then the test samples thus treated have been submitted to image analysis with a LEICA Quantiment 500+ computerized analyzer to detect white tonalities.

Subsequently, they have been exposed at a distance of about 50 cm, to a 300 Watt OSRAM Ultra-Vitalux lamp having a mixture of radiations similar to the high mountains natural solar radiation (Ultraviolet+visible).

At time intervals of 8, 16, 24 and 60 hours of exposure, the image analyses have been repeated to detect white tonalities. The obtained results have been reported in Table 1.

TABLE 1

| | | WHITE VALUES | | | | | |
|---|---|---|---|---|---|---|---|
| Time (h) | Not treated specimen | TiO2 free specimen | 1 | 2 | 3 | 4 | 5 |
| 0 | 211 | 183.2 | 185.4 | 184.5 | 183.7 | 184.7 | 182.7 |
| 8 | 211 | 185.3 | 200.1 | 194.9 | 190.5 | 189.5 | 188.1 |
| 16 | 211 | 187.1 | 203.5 | 197.6 | 194.1 | 192.6 | 191.1 |
| 24 | 211 | 190.0 | 206.2 | 200.8 | 197.7 | 195.6 | 193.2 |
| 60 | 212 | 194.9 | 211.9 | 206.5 | 204.5 | 203.6 | 201.0 |

As it results the test samples containing 10% of titanium dioxide, after 60 hours of exposure, show the same tone of white of the untreated surfaces; it must be pointed out that already after 8–16 hours of exposure white tonalities result to be very close to the not treated surfaces.

The test pieces containing the lowest dosages of titanium dioxide show an analogous trend, but obviously at lower levels, however proportional to the titanium dioxide content.

It may be observed that a certain bleaching action through the effect of light is obtained also on the test sample without TiO$_2$. In any case, low quantities of TiO$_2$ are sufficient to obtain a much greater bleaching effect.

However, from the visual observation of what has been instrumentally measured it results a more marked bleaching of the treated surfaces, especially if moistened, if compared to the not-treated surface.

EXAMPLE 2

4 cement mortar compositions (of identical formulation as those of Example 1) added with TiO$_2$ (P-25®—Degussa) have been manufactured following substantially the procedure described in the Example 1. In particular:

| |
|---|
| Composition D-5% of titanium dioxide by weight |
| E-1% of titanium dioxide by weight |
| F-0.5% of titanium dioxide by weight |
| G-0.1% of titanium dioxide by weight |

Unlike Example 1 the cement compositions have been applied to an external plastered wall of a building.

Every composition has been applied onto a surface of about 600 cm$^2$; the average thickness turned out to be equal to 1–2 mm.

Half of every surface (300 cm$^2$), corresponding to every composition above reported, has been treated with the same alcoholic solution comprising the organic pollutants of Example 1 (0.2 mg/cm$^2$ of dry product); then 2 surfaces have been obtained having well distinct colourations: yellow the treated part, white the not treated part.

Figure 2B:
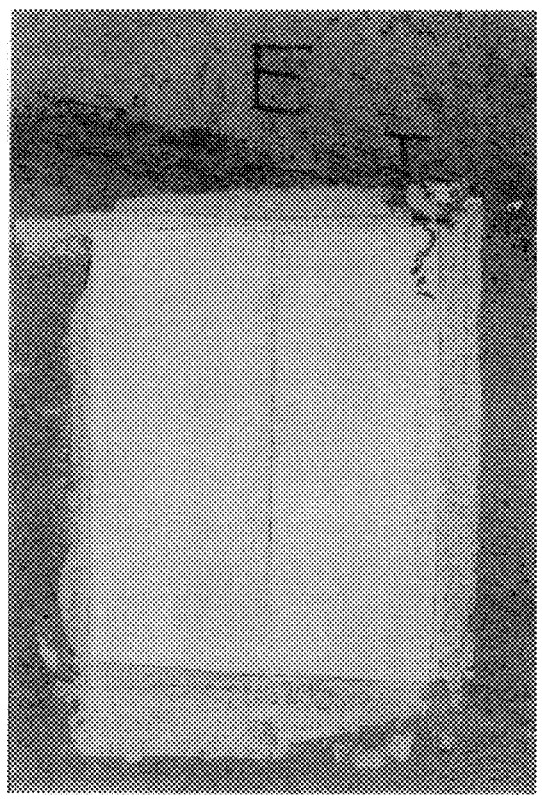
Figure 4A:
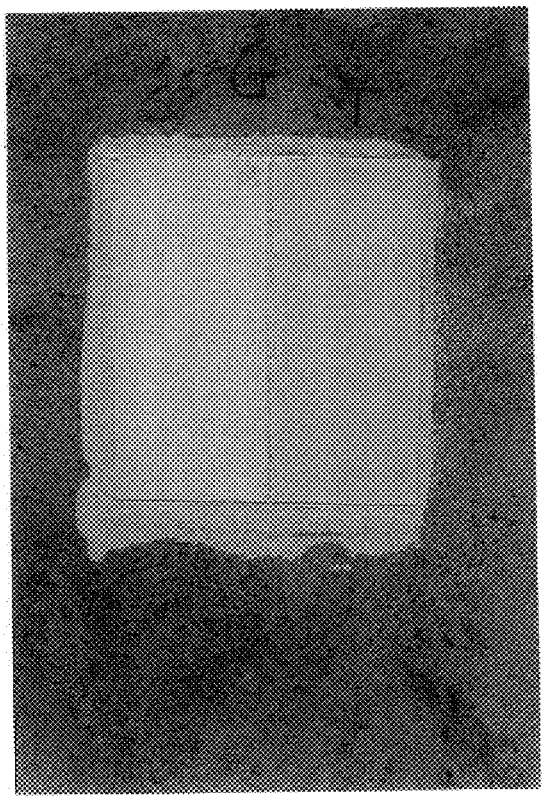
Figure 4B:
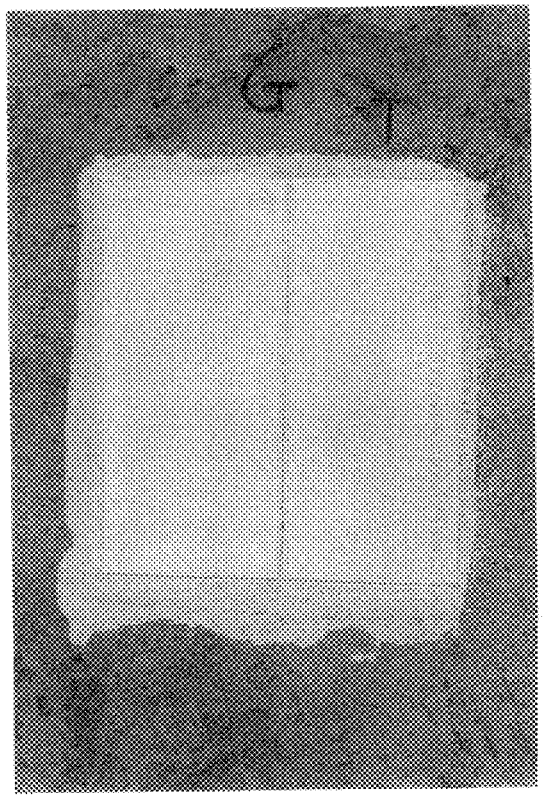

In FIGS. from 1 to 4 the images relative to the four compositions have been reported, in particular: FIGS. 1A–1B: composition D; FIGS. 2A–2B: composition E; FIGS. 3A–3B: composition F; FIGS. 4A–4B: composition G. The FIGS. 1A, 2A, 3A and 4A refer to the images of the surfaces relative to the four compositions D, E, F and G respectively immediately after the treatment with an alcoholic solution of half of said surfaces, the part coloured in yellow being indicated in every Figure with the T letter. After 1 week of exposure to sunlight the compositions have been photographed again and their images are reported in FIGS. 1B, 2B, 3B and 4B, which refer to the four compositions D, E, F and G respectively after 1 week exposure. As it results from FIGS. 1B–4B the surfaces treated with the organic pollutant reported to the original white.

EXAMPLE 3

Tioxide titanium paste ($TiO_2$ precursor) has been added at concentrations of 0.1%, 1% and 5% by weight respectively to the cement whose chemical and spectrometric analysis is reported in Table 2.

TABLE 2

| Chemical Analysis | |
|---|---|
| Ignition Loss | 2.68% |
| Brilliance | 90.0 |
| Dominating Wavelength | 569 nm |
| Purity | 2.3% |
| F | 0.380% |
| X Rays Spectrometric Analysis | |
| $SiO_2$ | 21.80% |
| $Al_2O_3$ | 3.60% |
| $Fe_2O_3$ | 0.25% |
| CaO | 65.86% |
| MgO | 0.98% |
| $SO_3$ | 3.15% |
| $Na_2O$ | 0.83% |
| $K_2O$ | 0.10% |
| SrO | 0.08% |
| $Mn_2O_3$ | <0.04% |
| $P_2O_5$ | 0.09% |
| $TiO_2$ | 0.03% |

With every mixture 3 test samples having 40×40×160 mm size have then been prepared in normal mortar according to EN 196.1 standard (cement/sand=1/3, w/c ratio=0.5).

By comparison 3 test samples without addition of titanium paste have been prepared.

The twelve test samples have been stored in a humid environment for 24 hours and once ejected they have been stored immersed in water up to the expiry of 28 days.

Then compressive strength tests have been carried out whose average results are reported in Table 3.

TABLE 3

|  | 1 | 2 | 3 | 4 |
|---|---|---|---|---|
| Titanium paste content (%) | — | 0.1 | 1 | 5 |
| Comprensive strength (MPa) | 58.1 | 58.2 | 57.4 | 56.7 |

As it results the addition of a $TiO_2$ precursor does not affect significantly cement compressive strength.

EXAMPLE 4

4 mortars with Italbianco Italcementi 52.5® cement having compositions (by weight) reported in Table 4 have been manufactured.

TABLE 4

|  | A | B | C | D |
|---|---|---|---|---|
| Italbianco ® Cement | 450 | 450 | 450 | 450 |
| White Aggregate (0.1–2 mm)-g | 1350 | 1350 | 1350 | 1350 |
| TiO2 P-25 ®-g (% by weight of cement) | — | 0.45 (0.1%) | 0.90 (0.2%) | 4.5 (1%) |
| Water | 225 | 225 | 225 | 225 |

With every mortar 3 test samples having 8×8×2 cm size have been manufactured. The test samples have been cured for 1 day in molds in an environment at 20° C. and R.H. >90%, after ejection they have been stored for further 7 days at 20° C. at R.H. about 60%. The twelve test samples have been submitted to a calorimetric test with a Cologard System 0.5 colorimeter in order to estimate brilliance, dominating wavelength and purity of the casting surface (8×8 cm). The results are reported in Table 5.

TABLE 5

| Paving tile No. | | Brilliance | Dom. Wavelength | Purity |
|---|---|---|---|---|
| As such | 1 | 82.3 | 576 | 3.9 |
|  | 2 | 81.4 | 576 | 3.9 |
|  | 3 | 81.9 | 576 | 3.9 |
| TiO2 0.1% | 4 | 81.6 | 576 | 3.9 |
|  | 5 | 80.6 | 576 | 3.5 |
|  | 6 | 80.7 | 576 | 3.5 |
| TiO2 0.2% | 7 | 81.1 | 576 | 3.5 |
|  | 8 | 79.8 | 576 | 3.5 |
|  | 9 | 80.3 | 576 | 3.5 |
| TiO2 1% | 10 | 81.3 | 576 | 3.5 |
|  | 11 | 81.5 | 576 | 3.5 |
|  | 12 | 81.2 | 576 | 3.5 |

Then the test samples have been exposed in an external environment subject to strong car traffic for 6 months. After this period the above described calorimetric measures have been repeated. The results are reported in Table 6.

TABLE 6

| Paving tile No. | | Brilliance | Dom. Wavelength | Purity |
|---|---|---|---|---|
| As such | 1 | 80 | 578 | 4.3 |
|  | 2 | 79.5 | 578 | 4.4 |
|  | 3 | 79 | 579 | 4.3 |
| TiO2 0.1% | 4 | 80 | 576 | 4.0 |
|  | 5 | 80 | 576 | 3.6 |
|  | 6 | 80 | 576 | 3.5 |
| TiO2 0.2% | 7 | 80.5 | 576 | 3.6 |
|  | 8 | 80.5 | 576 | 3.5 |
|  | 9 | 80.5 | 575 | 3.5 |
| TiO2 1% | 10 | 82 | 575 | 3.2 |
|  | 11 | 82 | 575 | 3.3 |
|  | 12 | 81.5 | 575 | 3.2 |

As it results brilliance, dominating wavelength and purity values of the test samples with titanium dioxide undergo with time lower changes if compared to the values of the test samples of the cement as such (without $TiO_2$).

EXAMPLE 5

2 samples of white cement (2 mm thick) are prepared on suitable supports having a discoid form with a diameter of 3.2 cm and thickness of 7 mm (substantially as described in Example 1).

2 samples containing 5% $TiO_2$ respectively of P-25® Degussa type (sample A) and AHR® (Tioxide) type (sample B).

For comparison purposes a third sample (C) without $TiO_2$ is prepared. In order to obtain surface reproducible and constant amounts of organic substance on the sample a phenanthroquinone solution in methanol is deposited by means of an aerograph thereby giving to a surface phenanthroquinone concentration equal to 0.1 mg of dry product/$cm_2$. At the end of said treatment every sample showed a homogenous surface of yellow colour.

Both before and after the deposition of the organic substances, reflectance spectrophotometric analyses have been carried out with a Perkin Elmer lambda 6 type spectrophotometer provided with an integrating sphere to eliminate scattered light responsible for anisotropy and surface irregularities.

The samples have been irradiated by means of a solar flow simulator, emitting radiation with wavelength higher than 290 nm.

The device used for irradiating consists of four 400 Watt lamps placed at the vertices of a square having at the center a carrying sample roundabout rotating on its own axis. By means of said device it has been possible to irradiate contemporaneously more samples with the same amount of photons per time unit.

The irradiation device SOLAR SIMULATOR SET-UP12/24 allows to carry out accelerating ageing test, wherein approximately 100 irradiation hours correspond to 1 year of sunlight.

For every sample at different times various 7 reflectance (R%) as a function of wavelength (nm) have been obtained.

The reflectance as previously pointed out is obtained by the ratio reflected light on a surface/inciding light on said surface. The % reflectance of the sample B are reported in FIG. 5 at different time as a function of wavelength (nm).

In particular with respect to FIG. 5, the curve 1 represents the spectrum before depositing the organic substance, the curve 2 represents the situation after deposition of said substance, the curves 3, 4, 5 represent the situation respectively after 2, 4 and 8 hours of irradiation. As it results already after 8 hours of irradiations the situation is almost the same as before the treatment with the pollutant.

The reflectance values must be normalized to allow a comparison among different materials having therefore a difference intrinsic reflectance.

The normalization coefficient Nt is defined as follows:

$$Nt = [Rt_o - R_t]/Rt_o$$

wherein $Rt_o$ is the reflectance of the sample at the time=0, before the application of the polluting substance, $R_t$ is the reflectance at the time t after the addition of the polluting substance (in this case the phenanthroquinone).

The normalization coefficient thus determined allows to calculate the residual Q% rendering possible a comparison among different material having a different intrinsic reflectance. In fact residual Q% may be easily calculated by applying the following the mathematical formula $$\text{residual } Q\% = \frac{1 - Nt_o poll - N_t}{Nt_o poll} \cdot 100$$

wherein $Nt_o poll$ is the normalization coefficient of the material after addition of the pollutant at t=0.

In table 7, residual Q% is reported as a function of the time of the above mentioned samples (A) (containing 5% P-25), (B) (containing 5% AHR®) and (C) (the sample without $TiO_2$) subjected to a wavelength higher than 290 nm (450 nm) and an air flow at T=60° C.

TABLE 7

| Time (hours) | P-25 ® residual Q% (A) | AHR ® residual Q% (B) | as such residual Q% (C) |
|---|---|---|---|
| 0 | 100 | 100 | 100 |
| 1 | 68.6 | 78.4 | 85.4 |
| 2 | 56.2 | 64.9 | 75.6 |
| 3 | 46.9 | 51.4 | 61.0 |
| 4 | 37.5 | 43.3 | 53.7 |
| 5 | — | — | — |
| 6 | 20.9 | 20.3 | 41.5 |
| 8 | 9.0 | 11.4 | 29.7 |

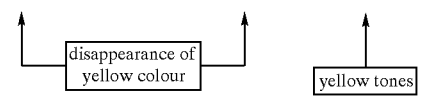

As it results from Table 7, samples containing titanium oxide give with time lower and lower normalized values, index of the photocatalyst activity.

The analytical data are also confirmed visually. In fact the total disappearance of yellow colouring due to phenanthroquinone is observed in samples containing $TiO_2$.

Although the normalized values corresponding to sample C decrease with time, visually it is possible to observe definite yellow zones on the sample surface.

As it again results from Table 7 the process works with different types of titanium oxide, prevailingly in the anatase form.

FIG. 6 resumes in the form of a diagram wherein residual Q% is reported in ordinates and time (hours) is reported in abscissae, the data of Table 7.

EXAMPLE 6

Using substantially the same process and the same device as those of Example 5, the photocatalytic activity of titanium dioxide P-25® on a white cement sample (prepared as described in Example 5) onto which carbon black was deposited.

Carbon black was deposited according to the following technique: a white cement discoid treated with 5% $TiO_2$ P-25® (Degussa) has been left for 10 minutes at a height of 10 mm from the flame of a candle. For comparison purposes the same test has been conducted on a sample without $TiO_2$.

The results of said tests are reported in FIG. 7. As it results from histograms of FIG. 8 the activity of the sample containing $TiO_2$ is evident.

EXAMPLE 7

The nitrogen oxides, comprising both NO and $NO_2$ (generally indicated with $NO_x$) play an important role in the atmoshpere chemistry.

A high concentration of these oxides with respect to the average quantity of the same in a not polluted area is due to the presence of movable sources (vehicles) and stationary sources and can originate acid rains or organic compounds such as peroxyacetyl nitrates (PAN) being irritating for eyes and phytoxic from plants.

Following substantially the technique described in Example 1, a white cement sample containing 1% by weight of $TiO_2$ of the A type was prepared.

The cement plate thus obtained has been placed at the base of a Plexyglass® glass box of 1 l capacity to evaluate the efficiency of $NO_x$ remotion from the cement containing the photocatalyst.

An air flow has been passed containing 0.6 ppm $NO_2$, 0.5 ppm NO and 60% relative humidity through the above described box lightened from the top by three 300 Watt Hg vapour lamps (emitting light with wavelength higher than 360 nm) placed at a distance of 15 cm from the sample.

The air flow of 2 l/min has been divided to guarantee a sufficient contact time of the air with cement, and to have a suitable flow for the detection system working Monitor cabs 8440 NITROGENOXIDE ANALYZER® chemiluminescence detector. For comparison purposes the same technique has been carried out on a cement sample not containing $TiO_2$.

The $NO_x$ decrease measured in the air leaving the box containing the cement sample with $TiO_2$ is of about 40% already after 3 hours of air flow, whereas no significant $NO_x$ reduction is observed in the air leaving the box containing the cement sample without $TiO_2$.

What is claimed is:

1. Cement composition, containing in bulk photocatalyst particles able to oxidize polluting substances in the presence of light, air, and environmental humidity, said composition comprising water, coarse or fine aggregates, a hydraulic binder and photocatalyst particles selected from the group consisting of tungstic oxide ($WO_3$), strontium titanate ($SrTiO_3$), calcium titanate and titanium dioxide ($TiO_2$), or precursor thereof, when the photocatalyst particles are particles of titanium dioxide, at least 5% by weight of said particles of titanium dioxide have the anatase structure, said photocatalyst particles present in an amount ranging from 0.01 to 10.0% by weight with respect to the hydraulic binder.

2. Cement composition according to claim 1, wherein, when the photocatalyst particles are particles of titanium dioxide, at least 25% by weight of said particles of titanium dioxide have the anatase structure.

3. Cement composition according to claim 1, wherein, when the photocatalyst particles are particles of titanium dioxide, at least 50% by weight of said particles of titanium dioxide have the anatase structure.

4. Cement composition according to claim 1, wherein, when the photocatalyst particles are particles of titanium dioxide, at least 70% by weight of said particles of titanium dioxide have the anatase structure.

5. Cement composition according to claim 1, wherein the titanium dioxide is in a 70:30 anatase $TiO_2$ rutile $TiO_2$ mixture.

6. Cement composition according to claim 1, wherein the precursor of $TiO_2$ is a titanium paste.

7. Cement composition according to claim 1, wherein the photocatalytic particles are particles of titanium oxide doped with one or more atoms different from Ti.

8. Cement composition according to claim 7, wherein the atoms different from Ti are selected from the group consisting of Fe(III), Mo(V), Ru(II), Os(III), Re(V), V(IV), and Rh(III).

9. Cement composition according to claim 1, wherein the photocatalyst is present in a quantity equal to 0.1% by weight with respect to the binder.

10. Cement composition according to claim 1, wherein the hydraulic binder is selected from a group consisting of a hydraulic material consisting of at least two thirds in mass of calcium silicates (3CaO $SiO_2$) and (2CaO $SiO_2$), and one third being $Al_2O_3$, $Fe_2O_3$ and other oxides, a cement binder and a hydraulic lime.

11. Dry premix containing in bulk photocatalyst particles able to oxidize polluting substances in the presence of light, air, and environmental humidity, said premix comprising, coarse or fine aggregates, a hydraulic binder and photocatalyst particles selected from the group consisting of tungetic oxide ($WO_3$), strontium tizanate ($SrTiO_3$), calcium titanate and titanium dioxide ($TiO_2$), or a precursor thereof, when the photocatalyst particles are particles of titanium dioxide, at least 5% by weight of said particles of titanium dioxide have the anatase structure, said photocatalyst particles being present in an amount ranging from 0.01 to 10% by weight with respect to the hydraulic binder.

* * * * *